UNITED STATES PATENT OFFICE.

JOHANNES PAESSLER, OF FREIBERG, AND HEINRICH ARNOLDI, OF WEINHEIM, GERMANY.

PROCESS FOR DECOLORIZING TANNIN EXTRACTS.

1,006,977. Specification of Letters Patent. Patented Oct. 24, 1911.

No Drawing. Application filed September 2, 1909. Serial No. 515,809.

*To all whom it may concern:*

Be it known that we, JOHANNES PAESSLER, chemist, and HEINRICH ARNOLDI, chemist, subjects of the German Emperor, residing, respectively, at Freiberg, in Saxony, and Weinheim, in Baden, Germany, have invented certain new and useful Processes for Decolorizing Tannin Extracts, of which the following is a specification.

For decolorizing tannin extracts sodium sulfite and sodium bisulfite are preferably employed. In some cases, particularly in the case of the mangrove bark extract, which is of a strong red color, these salts possess only a slight decolorization action. Some other processes also do not, in the case of this extract, lead to the desired end. By experiments which have been made it has been found that by the action of aluminium amalgam, tannin extracts in general, but particularly those of mangrove bark, mallet bark and quebracho wood, undergo quite a considerable decolorization and that the extracts so treated yield leathers of a lighter color which no longer show the red shade above mentioned and which darken but little under the action of light. The action of the aluminium amalgam is based upon the fact that it produces with water a powerful evolution of hydrogen and is at the same time converted into hydrated alumina. In its nascent state the hydrogen acts as a powerful deoxidizer upon the tannin material, whereby this latter becomes of a considerably lighter color; in addition to this too, the alumina formed forms tannate of alumina with the more strongly colored tannin material, whereby a further decolorization takes place. The principal action is, however, to be ascribed to the hydrogen in its nascent state.

To prepare the aluminium amalgam, aluminium scrap or waste preferably, from which the oil has been removed, is "bitten" with four to ten per cent. sodium hydroxid solution, rinsed twice in water and treated twice with a $\frac{1}{2}$% solution of chlorid of mercury each time for about two minutes. It is then washed with cold water, after which the aluminium amalgam is ready for use. As it does not keep well in large quantities, the preparation is only undertaken before use.

The decolorizing operation may be conveniently carried out in the following manner:—The extracts are best used at the strength at which they are obtained by leaching out; they are placed in a vessel provided with a stirring apparatus, warmed to about 30 to 40 degrees centigrade, the aluminium amalgam is added and the stirring apparatus set in motion. After about two hours the decolorizing is ended; the mass is then heated to about 90 degrees centigrade, being stirred the while, and then allowed to cool down, the insoluble compounds settling to the bottom. The extract is then separated from the latter in the known manner and further concentrated. About 80 grams of aluminium are used to 100 kilograms of tannin extract of 10 degrees Bé. In this process only small losses of tannin take place. Care should be taken not to make the quantity of aluminium too large, as otherwise comparatively great losses of tannin material may take place.

According to the specification of British Patent No. 11502 of 1902 it is proposed to decolorize tannin extracts by treating them with powdered metals, *inter alia*, with powdered aluminium. This process, however, is devoid of any practical value, as the action of the unamalgamated aluminium upon the tannin extracts is almost *nil*. On the contrary by means of the present process, that is, the treatment of the extracts with aluminium amalgam, a very favorable action is obtained; the decolorization is an extensive one, and the hides tanned with the decolorized tannin extracts are of a light color and no longer exhibit the red shade of color.

What we claim is:—

1. The process for decolorizing tannin extracts, which consists in treating the extracts with aluminium amalgam, substantially as described.

2. The process for decolorizing tannin extracts, which consists in adding to the tannin extracts aluminium amalgam, stirring the mixture, then heating and again stirring the mixture, allowing it to cool and settle, separating the resulting liquid from the sediment and concentrating the liquid, substantially as described.

In witness whereof we have hereunto set our hands in presence of two subscribing witnesses.

JOHANNES PAESSLER.
HEINRICH ARNOLDI.

Signed by J. Paessler in the presence of—
  H. SLUYTER,
  R. LAUFFMANN.
Signed by Heinr. Arnoldi in the presence of—
  L. BREHM,
  V. DICHMANN.

---

Copies of this patent may be obtained for five cents each, by addressing the "Commissioner of Patents, Washington, D. C."